(12) United States Patent
Kolla et al.

(10) Patent No.: US 9,134,777 B2
(45) Date of Patent: Sep. 15, 2015

(54) BI-MODAL POWER DELIVERY SCHEME FOR AN INTEGRATED CIRCUIT COMPRISING MULTIPLE FUNCTIONAL BLOCKS ON A SINGLE DIE TO ACHIEVE DESIRED AVERAGE THROUGHPUT FOR THE INTEGRATED CIRCUIT

(75) Inventors: Yeshwant Nagaraj Kolla, Wake Forest, NC (US); Jeffrey Herbert Fischer, Cary, NC (US); William R. Flederbach, Holly Springs, NC (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 13/489,859

(22) Filed: Jun. 6, 2012

(65) Prior Publication Data

US 2013/0332748 A1    Dec. 12, 2013

(51) Int. Cl.
*G06F 1/00*    (2006.01)
*G06F 1/26*    (2006.01)
*G06F 1/32*    (2006.01)

(52) U.S. Cl.
CPC .. *G06F 1/26* (2013.01); *G06F 1/32* (2013.01); *G06F 1/3203* (2013.01); *Y02B 60/1214* (2013.01)

(58) Field of Classification Search
CPC ...... G06F 1/3203; G06F 1/26; Y02B 60/1217
USPC .......................................................... 713/300
See application file for complete search history.

(56) References Cited

U.S. PATENT DOCUMENTS

| | | | |
|---|---|---|---|
| 5,832,286 A * | 11/1998 | Yoshida | 713/324 |
| 6,809,538 B1 | 10/2004 | Borkar | |
| 7,170,811 B1 * | 1/2007 | Allen | 365/226 |
| 7,492,215 B2 | 2/2009 | Lee et al. | |
| 7,539,882 B2 * | 5/2009 | Jessup et al. | 713/300 |
| 7,646,197 B2 | 1/2010 | Misaka et al. | |
| 7,702,371 B2 | 4/2010 | Edwards et al. | |
| 7,705,486 B2 | 4/2010 | Lee | |
| 7,958,379 B2 | 6/2011 | Totsuka et al. | |
| 2003/0137787 A1 | 7/2003 | Kumar et al. | |
| 2008/0178030 A1 * | 7/2008 | Koizumi | 713/324 |
| 2009/0167270 A1 * | 7/2009 | Lam et al. | 323/283 |
| 2009/0240959 A1 * | 9/2009 | Conroy et al. | 713/300 |

(Continued)

OTHER PUBLICATIONS

International Search Report and Written Opinion—PCT/US2013/044590—ISA/EPO—Aug. 21, 2013.

(Continued)

*Primary Examiner* — Jaweed A Abbaszadeh
*Assistant Examiner* — Gayathri Sampath
(74) *Attorney, Agent, or Firm* — Peter Michael Kamarchik; Nicholas J. Pauley; Paul Holdaway

(57) ABSTRACT

Systems and methods for bi-modal and fine grained power delivery to an integrated circuit comprising functional blocks. A first power source is coupled to a functional block of the integrated circuit for supporting a first operating mode of the functional block. A second power source is coupled to the functional block for supporting a second operating mode of the functional block. The first and second operating modes can be high and low frequency modes respectively. The second power source can be derived from the first power source using on-die regulators or provided independently. A desired average throughput of the functional block can be achieved by controlling duty cycles of the first and second power sources.

15 Claims, 6 Drawing Sheets

(56) References Cited

U.S. PATENT DOCUMENTS

2011/0154068 A1 6/2011 Huang et al.
2012/0023345 A1* 1/2012 Naffziger et al. ............. 713/320
2012/0079290 A1* 3/2012 Kumar et al. ................. 713/300

OTHER PUBLICATIONS

Chao C.H., et al., "Traffic and Thermal-Aware Run-Time Thermal Management Scheme for 3D NoC Systems", Networks-on-Chip (NOCS), 2010 Fourth ACM/IEEE International Symposium on, IEEE, Piscataway, NJ, USA, May 3, 2010, pp. 223-230, XP031707246, ISBN: 978-1-4244-7085-3 abstract; figures 1,2,8,9,10 p. 223, col. 2, line 15-line 33 p. 224, col. 1, line 27-line 54 line 17-line 30 line 1—p. 227, p. 224, col. 2, p. 226, col. 2, col. 1, line 27.

Ituero P. et al., "Leakage-based on—Chi Thermal Sensor for CMOS Technology" IEEE, May 27, 2007, pp. 3327-3330, XP031182017.

* cited by examiner

BI-MODAL POWER DELIVERY SCHEME FOR AN INTEGRATED CIRCUIT COMPRISING MULTIPLE FUNCTIONAL BLOCKS ON A SINGLE DIE TO ACHIEVE DESIRED AVERAGE THROUGHPUT FOR THE INTEGRATED CIRCUIT

FIELD OF DISCLOSURE

Disclosed embodiments are directed to power delivery schemes for integrated circuits. More particularly, exemplary embodiments are directed to a bi-modal power delivery system configured to provide fine grained power delivery to a plurality of functional blocks integrated on a single semiconductor die.

BACKGROUND

Switching power or dynamic power consumed by digital circuits is generally governed by the formula. $P=FCV^2$, wherein C is the value of the capacitance being switched, F is the clock frequency of switching, and V is the magnitude of the voltage occurring at the switching component. There is a well recognized need in the art, especially with respect to handheld and battery operated devices, for reduced power consumption. Conventional techniques to reduce power consumption involve lowering the voltage V and the frequency F in order to reduce dynamic power.

Digital circuits are usually integrated on semiconductor dies, wherein several functional blocks may be present on a single semiconductor die. These functional blocks may encompass a wide variety of functional elements, and thus, their frequency and voltage needs may vastly differ. Therefore, in order to meet low power targets, each of these functional blocks may be independently operated such that their respective frequency and voltage values may be appropriately scaled.

However, operating the several functional blocks independently at individual voltages and frequencies may require individual clock and voltage sources for each functional block. In general, because voltage sources essentially control the power supply, voltage sources will also be referred to as power sources in this description. Accompanying challenges arise in providing such individual power sources. With reference now to FIG. 1, a conventional digital circuit 100 with N functional blocks: $102_1 \ldots 102_N$ is illustrated. Digital circuit 100 may be integrated on a semiconductor die, wherein the semiconductor die may be integrated in a package with a limited number of pins to connect the package to a next level of assembly, such as a printed circuit card. The pins may include signal input/output pins as well as power pins. The printed circuit card may itself be limited in the number of pins it can accommodate.

Returning now to FIG. 1, power sources $104_1 \ldots 104_N$ may be coupled to digital circuit 100 in order to supply individually tailored power to functional blocks $102_1 \ldots 102_N$ respectively. Power sources $104_1 \ldots 104_N$ may be configured for frequency and voltage scaling, such that customized clocks and voltages may be provided to each of functional blocks $102_1 \ldots 102_N$. As shown, power sources $104_1 \ldots 104_N$ may be provided outside the semiconductor die or package which houses digital circuit 100. Due to the limitations in resources (e.g. pins), and high costs associated with providing a large number of power sources as the number of functional blocks increase, conventional implementations such as digital circuit 100 become impractical.

Alternately, known implementations may include on-die voltage regulators (e.g. for regulating frequency or voltage, or collectively, "power") that are integrated on the same semiconductor die as the functional blocks. While conventional on-die voltage regulators may be configured to provide, for example, programmable supply voltage to individual functional blocks, they come at prohibitively high costs. These on-die voltage regulators usually consume a large on-die area. The on-die voltage regulator of choice is a switch mode power supply topology, which may include inductors. The use of a number of inductors in order to deliver power to the individual functional blocks increases costs, and moreover, these inductors are not easily amenable for integration on the semiconductor die. Further, these on-die voltage regulators generate significant amounts of thermal energy which is undesirable in mobile devices.

Accordingly, there is a need in the art to overcome aforementioned limitations of conventional implementations, and deliver fine-grained power management solutions for digital circuit designs comprising various functional blocks integrated on a semiconductor die.

SUMMARY

Exemplary embodiments of the invention are directed to systems and method for bi-modal and fine grained power delivery to a plurality of functional blocks integrated on a single semiconductor die.

For example, an exemplary embodiment is directed to a method of delivering power to an integrated circuit comprising functional blocks, the method comprising: providing a first power source to a first functional block of the integrated circuit for supporting a first operating mode of the first functional block, deriving a second power source from the first power source, and providing the second power source to the first functional block for supporting a second operating mode of the first functional block.

Another exemplary embodiment is directed to an integrated circuit for bi-modal power delivery comprising: a first functional block, a first power source coupled to the first functional block and configured to support a first operating mode of the first functional block, and a second power source derived from the first power source, the second power source coupled to the first functional block and configured to support a second operating mode of the first functional block.

Yet another exemplary embodiment is directed to a system configured for bi-modal power delivery, the system comprising: a first integrated circuit means, a first power means coupled to the first integrated circuit means and configured to support a first operating mode of the first integrated circuit means, and a second power means derived from the first power means, the second power means coupled to the first integrated circuit means and configured to support a second operating mode of the first integrated circuit means.

Another exemplary embodiment is directed to a non-transitory computer-readable storage medium comprising code, which, when executed by a processor, causes the processor to perform operations for delivering power to an integrated circuit comprising functional blocks, the non-transitory computer-readable storage medium comprising: code for providing a first power source to a first functional block of the integrated circuit for supporting a first operating mode of the first functional block, code for deriving a second power source from the first power source, and code for providing the second power source to the first functional block for supporting a second operating mode of the first functional block.

Another exemplary embodiment is directed to a method of delivering power to an integrated circuit comprising functional blocks, the method comprising: providing a first power source to a first functional block of the integrated circuit for supporting an operating mode of the first functional block, providing a second power source to the first functional block for supporting a second operating mode of the first functional block, and controlling duty cycles of providing the first and second power sources to the first functional block to achieve a desired average throughput of the first functional block.

Another exemplary embodiment is directed to an integrated circuit for bi-modal power delivery comprising: a first functional block, a first power source coupled to the first functional block and configured to support a first operating mode of the first functional block, a second power source coupled to the first functional block and configured to support a second operating mode of the first functional block, and a first sequencer to control duty cycles of the first and second power sources to achieve a desired average throughput of the first functional block.

Another exemplary embodiment is directed to a system configured for bi-modal power delivery, the system comprising: a first integrated circuit means, a first power means coupled to the first integrated circuit means and configured to support a first operating mode of the first integrated circuit means, a second power means coupled to the first integrated circuit means and configured to support a second operating mode of the first integrated circuit means, and a first sequencer means configured to control duty cycles of the first and second power means to achieve a desired average throughput of the first integrated circuit means.

Yet another exemplary embodiment is directed to a non-transitory computer-readable storage medium comprising code, which, when executed by a processor, causes the processor to perform operations for delivering power to an integrated circuit comprising functional blocks, the non-transitory computer-readable storage medium comprising: code for providing a first power source to a first functional block of the integrated circuit for supporting an operating mode of the first functional block, code for providing a second power source to the first functional block for supporting a second operating mode of the first functional block, and code for controlling duty cycles of providing the first and second power sources to the first functional block to achieve a desired average throughput of the first functional block.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
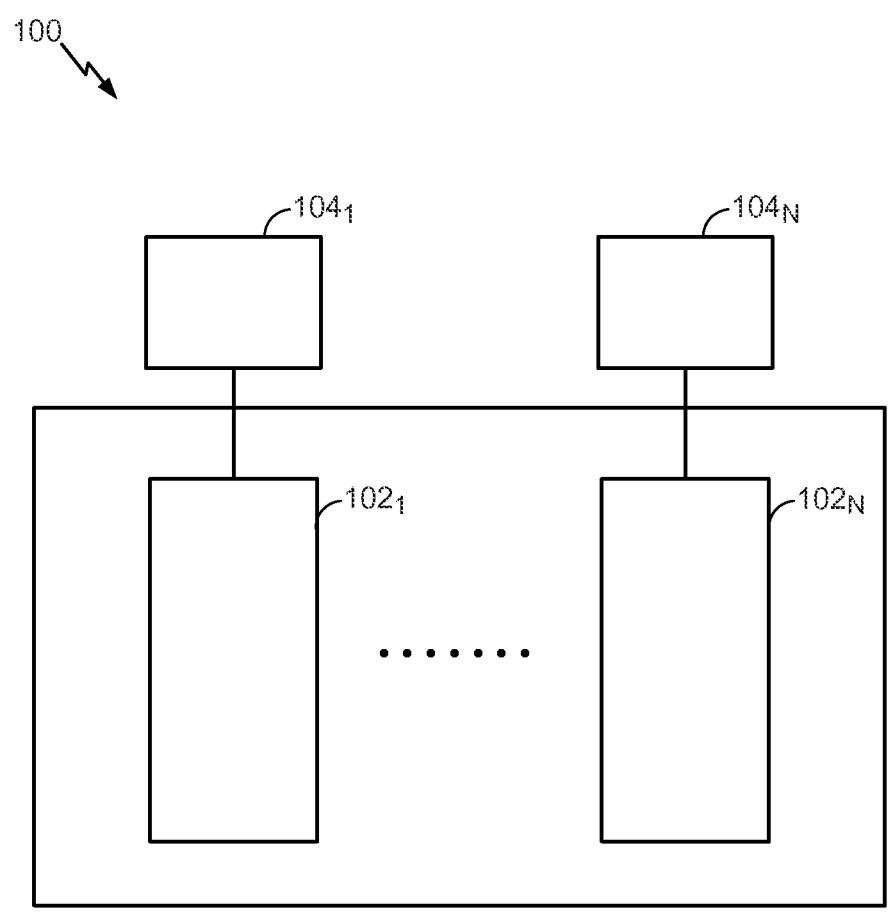
FIG. 1 is a schematic of a conventional implementation for power delivery in a digital circuit comprising functional elements integrated on a semiconductor die.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments recognize the need for providing customized operating frequency and voltage to one or more functional blocks which may be integrated on a semiconductor die, without requiring a full complement of pins associated with separate power delivery for each functional block. Accordingly, exemplary embodiments may include a bi-modal power delivery scheme comprising two distinct power sources for delivering power to functional blocks integrated on a semiconductor die. A first power source may be configured to deliver high voltage or power. For example the first power source may be a high current shared network configured to support high power (and correspondingly, high performance/frequency) operation of the functional blocks. A second power source may be configured to deliver a low voltage or power. In some embodiments, the second power source may be derived from the first power source and may comprise one or more low current on-die voltage regulators integrated on the same semiconductor die as the functional blocks, and configured to support low power (and correspondingly, low performance/frequency) operation of the functional blocks. In some other embodiments, the second power source may be a low current shared network configured to support the low power/low performance/low frequency operation of the functional blocks.

Figure 2A:
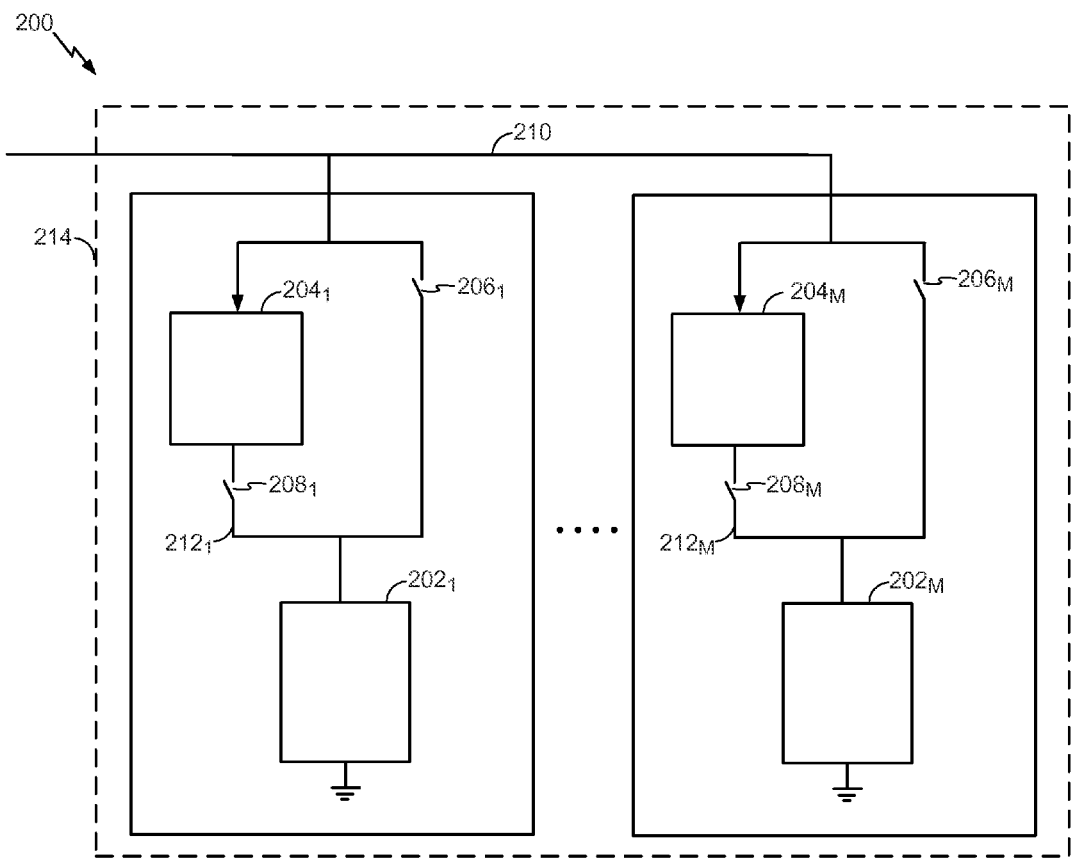
FIGS. 2A-B are schematic illustrations of exemplary processing systems 200 and 250 configured for bi-modal power delivery to functional blocks integrated on a semiconductor die, according to exemplary embodiments.

With reference now to FIG. 2A, a first exemplary processing system 200 is illustrated. Processing system 200 may include integrated circuit 214. Accordingly, integrated circuit 214 may comprise M functional blocks, $202_1 \ldots 202_M$, as shown. These M functional blocks may comprise any one of or combination of known digital logic elements, semiconductor circuits, processing cores, memory structures, etc. Embodiments described herein are not restricted to any particular arrangement of functional blocks, and the disclosed techniques may be easily extended to various structures and layouts of functional blocks on semiconductor dies or packages.

With continuing reference to FIG. 2A, integrated circuit 214 may be integrated on a semiconductor die or package. It may be assumed that the semiconductor die or package may support a limited number of pins such as input/output and power pins. Accordingly, embodiments optimize the use of the limited number of power pins in the described power delivery schemes. Shared voltage rail 210 may be derived from an external power source and used to supply high voltage to the M functional blocks $202_1 \ldots 202_M$. As shown, shared voltage rail 210 may find an entrance point in the semiconductor die or package comprising integrated circuit 214 through a single pin, or in other embodiments, a small number of one or more pins may be utilized to extend shared voltage rail 210 to the M functional blocks. The number of pins may depend on parameters such as the value of M, the layout of the functional blocks, etc. Shared voltage rail 210 may comprise the first power source described above, and thus may be configured to carry high voltage.

Shared voltage rail 210 may also feed on-die voltage regulators $204_1 \ldots 204_M$ which may be integrated on the semiconductor die or package comprising integrated circuit 214. In the illustrated embodiment, M on-die voltage regulators $204_1 \ldots 204_M$ are shown corresponding to M functional blocks $202_1 \ldots 202_M$ respectively. However, it will be understood that the configuration shown in FIG. 2A is for illustrative purposes only, and in some embodiment a single on-die voltage regulator may be shared between one or more functional blocks. As shown, on-die voltage regulators $204_1 \ldots 204_M$ may be configured to convert the high voltage received from shared voltage rail 210 to a low voltage output, which is driven on low voltage rails $212_1 \ldots 212_M$. These on-die voltage regulators $204_1 \ldots 204_M$ may represent the above-noted second power source configured to output low voltage on low voltage $212_1 \ldots 212_M$. The individual voltage output values of these on-die voltage regulators $204_1 \ldots 204_M$ may be determined such that they meet the minimum voltage value requirements of corresponding functional blocks $202_1 \ldots 202_M$. One way to determine the minimum voltage requirement may be based on the minimum voltage required to support a specified operating frequency of the corresponding functional block. Skilled persons will recognize suitable variations of the above embodiments for particular circuit configurations.

The M functional blocks $202_1 \ldots 202_M$ may be connected to the first and second power sources as shown in FIG. 2A. M high power switches $206_1 \ldots 206_M$ may couple the M functional blocks $202_1 \ldots 202_M$ to shared voltage rail 210 forming the first power source; and M low power switches $208_1 \ldots 208_M$ may couple the M functional blocks $202_1 \ldots 202_M$ respectively to the M low voltage rails $212_1 \ldots 212_M$ coupled to M on-die voltage regulators $204_1 \ldots 204_M$ forming the second power source.

It will be appreciated that exemplary embodiments including the bi-modal power delivery scheme overcome the drawbacks associated with conventional implementations described previously. For example, with regard to the first power source, shared voltage rail 210 comes at a significantly reduced cost, in comparison to conventional implementations requiring dedicated power supplies for each functional block. Further, shared voltage rail 210 simplifies power routing to the semiconductor die or package comprising integrated circuit 214, and allows for wide power routes to connect to a printed circuit board which may be coupled to the semiconductor die or package. Wide power routes of shared rail 210 enable low inductance power delivery paths resulting in lower power supply noise. Additionally, load averaging occurs among the M functional blocks $202_1 \ldots 202_M$ coupled to shared voltage rail 210, thus reducing the occurrence of large current load spikes. As will be recognized, the above characteristics of shared voltage rail 210 also facilitate on-die power distribution in that a simplified design of upper metal layers which share voltage rail 210 may be realized.

With regard to the second power source, response times for exemplary on-die voltage regulators $204_1 \ldots 204_M$ configured for only low voltage outputs may be significantly faster, in comparison for example, to conventional regulators configured for a whole range varying from low to high voltage output requirements. Correspondingly, less power is consumed in exemplary on-die voltage regulators $204_1 \ldots 204_M$, because full swings between low and high voltage outputs are eliminated. Moreover, for similar reasons, exemplary on-die voltage regulators $204_1 \ldots 204_M$ may not require integrated inductors. Accordingly, on-die voltage regulators $204_1 \ldots 204_M$ may be smaller and involve simpler design considerations in comparison to conventional full voltage range switched mode power supply regulators.

Additionally, the on-die network associated with voltage rails $212_1 \ldots 212_M$ may have much lower capacitance requirements than off-die networks. Because on-die voltage regulators $204_1 \ldots 204_M$ are electrically closer to the consuming circuits (functional blocks $202_1 \ldots 202_M$), they may be better suited to sense and respond to load variations with improved frequency bandwidth.

In some embodiments, processing system 200 may comprise logic or software (not separately illustrated) to dynamically determine a mode associated with each of the M functional blocks $202_1 \ldots 202_M$. If for a particular functional block, say functional block $202_1$, it is determined that a high performance or high frequency operation is desired at a point in time, then functional block $202_1$ may derive its operating voltage from the first power source, i.e. shared voltage rail 210 by switching on its high power switch $206_1$ and switching off its low power switch $208_1$. Similarly, in the converse case wherein a low performance or low frequency operation is desired, functional block $202_1$ may derive its operating voltage from the second power source, i.e. on-die voltage regulator $204_1$ via low voltage rail $212_1$ by switching on its low power switch $208_1$ and switching off its high power switch $206_1$.

As mentioned previously, in some embodiments, the number of on-die voltage regulators and switches may be reduced as these may be shared across functional blocks. For example two or more functional blocks may share a single on-die voltage regulator as their second power source. In one exemplary embodiment, the output of the shared on-die voltage regulator may be coupled to the two or more functional blocks through two or more low power switches respectively. In another exemplary embodiment, one or more low power switches may also be shared across two or more functional blocks, for example in scenarios where these two or more functional blocks may have similar frequency/performance requirements. Because switching logic may incur costs in terms of on-die area and power, such sharing may bring down associated costs. Suitable software/hardware support may be added to support such sharing and also to determine functional blocks which may be amenable to sharing low power switches.

Accordingly, through the appropriate use of logic or software, processing system 200, may determine the above high or low frequency/performance modes for each of the M functional blocks $202_1 \ldots 202_M$ by taking into account parameters such as the nature and amount of work that needs to be accomplished by individual functional blocks at any particular instance or time interval. Frequency/performance modes may also be designed such that a particular functional block may be configured to operate at a high frequency/performance mode for a first time period; and for a second time period, either turned-off completely (e.g. by turning off both the high power and low power switch associated with the particular functional block) or transitioned to low frequency/performance mode. In exemplary embodiments, processing system 200 may also determine frequency/performance modes for a particular functional block, such that the particular functional block is configured to operate entirely under the lowest (or highest) allowable frequency and voltage values. Yet other embodiments may take into account parameters such as a desired average computational throughput for processing system 200, thereby fixing frequency/performance modes for individual functional blocks in a manner that would meet the desired average computational throughput.

It will also be understood that while the above-described bi-modal power delivery schemes in exemplary embodiments define two power ranges corresponding to two power sources, neither power source is tied to a particular voltage. For example, low voltage rail 212 may be programmed to provide voltage across a low voltage operating window, which may overlap with a voltage operating window of the high voltage shared voltage rail 210. In another example, shared voltage rail 210 may be configured to carry low voltage if it is determined that efficiency of processing system 200 may be improved by thus reducing the voltage level on shared voltage rail 210.

Figure 2B:
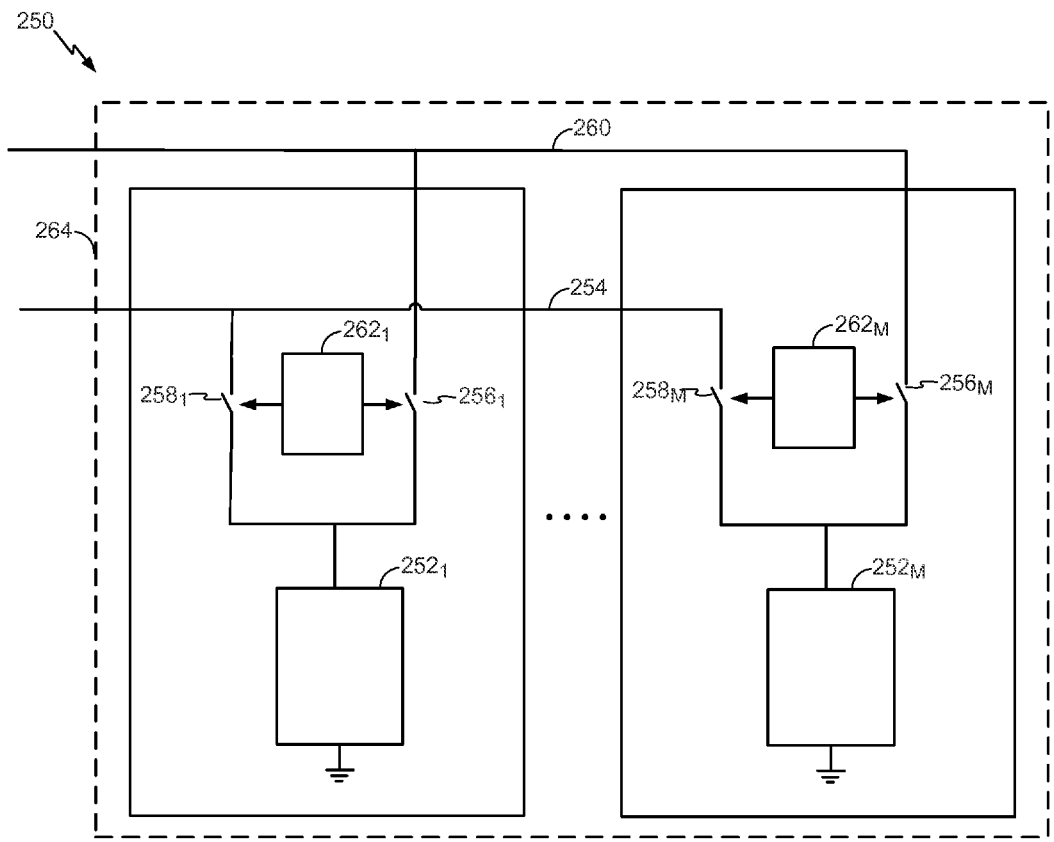

With reference now to FIG. 2B a second exemplary processing system 250 is illustrated. Processing system 250 is notably different from processing system 200 in that the second power source may be independent and comprise a shared network instead of being derived from the first power source using one or more on-die voltage regulators. More particularly, processing system 250 may include integrated circuit 264 comprising M functional blocks, $252_1 \ldots 252_M$, as shown. Shared voltage rails 260 and 254 may be derived from external power sources and may be configured as the first and second power sources to supply high voltage and low voltage respectively to the M functional blocks $252_1 \ldots 252_M$. The M functional blocks $252_1 \ldots 252_M$ may be connected to the first and second power sources using M high power switches $256_1 \ldots 256_M$ and M low power switches $258_1 \ldots 258_M$ respectively. M sequencer blocks $262_1 \ldots 262_M$ may be configured to control the M high power switches $256_1 \ldots 256_M$ and the M low power switches $258_1 \ldots 258_M$ as shown.

In processing system 250, a desired throughput for each of the M functional blocks $252_1 \ldots 252_M$ can be achieved by controlling a duty cycle of the first and second power sources, 260 and 254 respectively. Throughput may relate to previously described performance modes of the functional blocks. In one example, a desired throughput for a functional block may relate to a number of instructions which can be processed in a unit of time. A conventional unit of measurement of throughput can be in terms of millions of instructions per second (MIPS). As previously described, a higher throughput or a higher value of MIPS can be achieved for a particular functional block by operating it in a high performance mode by coupling the functional block to a high voltage power source. Correspondingly, a lower throughput or lower value of MIPS can be achieved by operating the functional block in a low performance mode by coupling the functional block to a low power source. Thus, any desired average throughput in a range of throughput values lying between the highest and lowest possible throughput values for a particular functional block can be achieved by proportionally controlling the amounts of time the functional block is operated in the high and low performance modes. The relative amounts of times that the functional block is operated in the high and low performance modes may be measured in terms of duty cycles.

In a non-limiting illustrative example, the first power source 260 may be a high voltage shared network capable of carrying high voltage values in the range of 1-1.1V whereas the second power source 254 may be a low voltage shared network capable of carrying low voltage values in the range of 0.6-0.7V. In this illustrative example, a particular functional block $252_M$ may be capable of a maximum throughput of 3 MIPS when coupled to the highest voltage value 1.1V, and a minimum throughput of 0.5 MIPS when coupled to the lowest voltage value 0.6V. In one embodiment, a throughput of 2 MIPS in between the highest and lowest possible throughputs for functional block $252_M$ can be achieved primarily by controlling the high power switch $256_M$ and the low power switch $258_M$, thereby controlling the amount of time functional block $252_M$ is operated by being coupled to the first power source 260 and the second power source 254 respectively, in a given unit of time. Sequencer block $262_M$ can be configured to control the high power switch $256_M$ and the low power switch $258_M$ accordingly. The duty cycle relative to each power source may be defined as the amount of time that power source is used to supply power to the functional block $252_M$ through the corresponding power switch in the unit of time. M sequencer blocks $262_1 \ldots 262_M$ may be configured to control duty cycles relative to corresponding M functional blocks, $252_1 \ldots 252_M$ in the above described manner, the logic/functionality of these M sequencer blocks $262_1 \ldots 262_M$ need not be separated into M separate blocks as illustrated, and may be unified into a global control which can be placed in any location as per particular needs. In some embodiments, the sequencer blocks or global control may even be located off chip or outside the integrated circuit 264, or in some embodiments the related functions of these blocks may be performed using software algorithms. Skilled persons will recognize appropriate variations of the above described embodiments.

Continuing with the above illustrative example, in another embodiment, the voltage values within the high voltage and the low voltage ranges may also be altered in addition to or instead of controlling the duty cycles in order to achieve the desired throughput. For example, if the duty cycles were fixed at a constant value, particular voltage values within the high voltage range of 1-1.1V and the low voltage range of 0.6-0.7V may be selected in order to achieve the desired throughput of 2 MIPS for the fixed duty cycle. Controlling both voltage values within the high and low voltage ranges as well as controlling the duty cycles may provide fine tuned control for achieving desired throughput values in exemplary embodiments.

While not illustrated, more than two power sources may be provided in some embodiments. For example, in addition to a first and second power source for high and low voltage, a third power source for mid-range voltage may also be provided in cases where the gap between the high and low voltage ranges is high. Thus, particular systems may be configured with any number of power sources without departing from the scope of the embodiments. For example, in some exemplary processing systems, power delivery to functional blocks may be based on combinations of power delivery schemes described with regard to processing systems 200 and 250 of FIGS. 2A and 2B respectively. Accordingly, the second power source for some functional blocks can be derived from an external low voltage power supply while some functional blocks can derive their second power source from the first power source through the use of on-die regulators. Thus, the exemplary techniques can be integrated within a same processing system or integrated circuit.

Figure 3A:
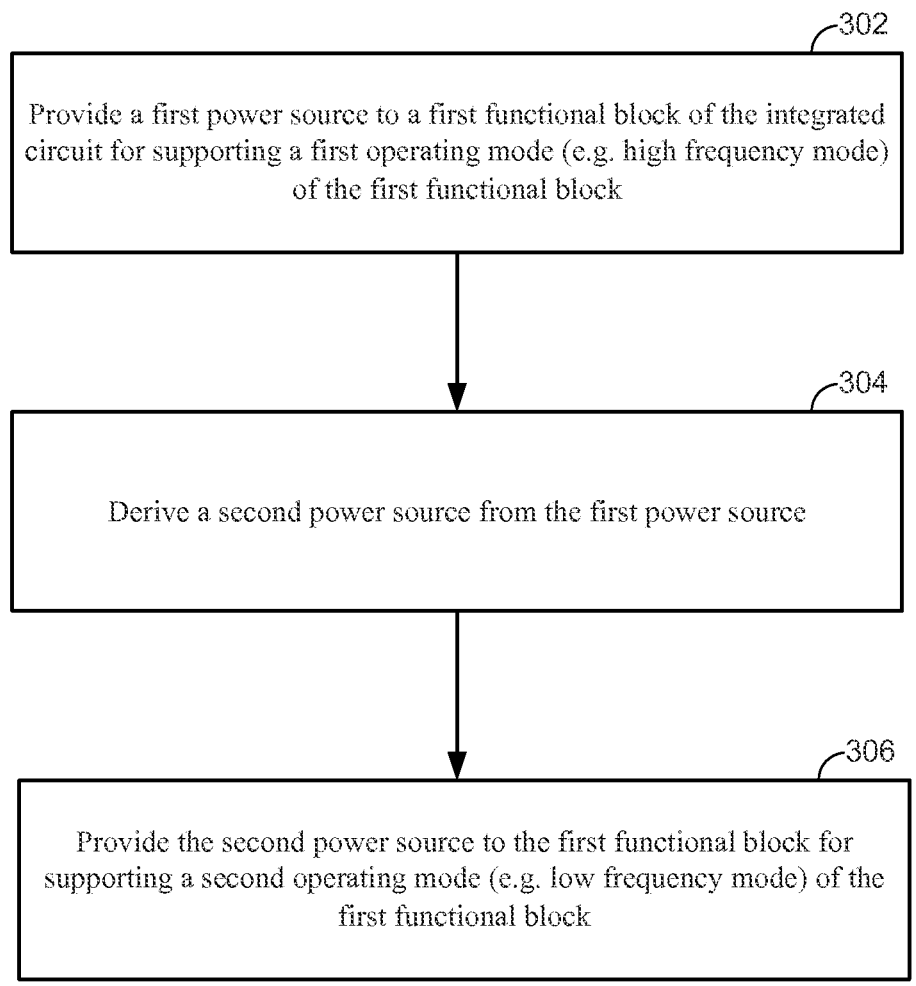
FIGS. 3A-B are flow charts illustrating the operational flow of defining a bi-modal power delivery source for functional blocks integrated in a semiconductor die, according to exemplary embodiments.

Accordingly, it will be appreciated that embodiments include various methods for performing the processes, functions and/or algorithms disclosed herein. In one example, as illustrated in FIG. 3A, a first exemplary embodiment can include a method of delivering power to an integrated circuit (e.g. integrated circuit 214) comprising: providing a first power source (e.g. shared voltage rail 210) to a first functional block (e.g. functional blocks $202_1$) of the integrated circuit for supporting a first operating mode of the first functional block—Block 302; deriving a second power source (on-die voltage regulator $204_1$) from the first power source—Block 304; and providing the second power source to the first functional block for supporting a second operating mode of the first functional block—Block 306. In one embodiment, the first operating mode may be a high frequency operating mode and the second operating mode may be a low frequency operating mode. The desired frequency at an operating mode may be based on parameters such as a desired power target of the first functional block, desired efficiency of the first functional block, desired average computational throughput of the integrated circuit, etc. In some embodiments, the first functional block may be operated in the high frequency operating mode for a first time period and in the low frequency operating mode for a second time period. The first and second time periods may be based on a desired average throughput for the integrated circuit. Those of skill in the art will appreciate that the operating modes are not limited to those determined by frequency, but may include any other high and low power modes.

Figure 3B:
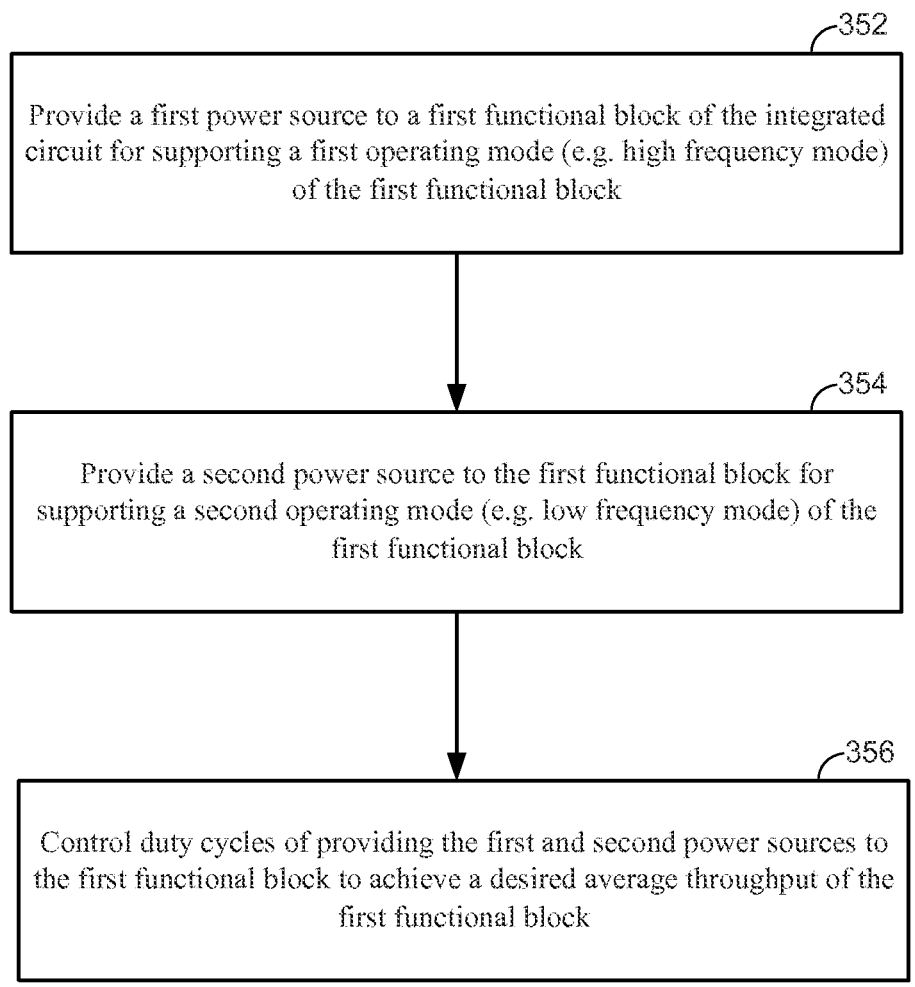

In another example, as illustrated in FIG. 3B, a second exemplary embodiment can include a method of delivering power to an integrated circuit (e.g. integrated circuit 264) comprising: providing a first power source (e.g. shared high voltage rail 260) to a first functional block (e.g. functional block $252_M$) of the integrated circuit for supporting a first operating mode of the first functional block—Block 352; providing a second power source (e.g. shared low voltage rail 254) to the first functional block for supporting a second operating mode of the first functional block—Block 354; and controlling duty cycles of providing the first and second power sources to the first functional block (e.g. using sequencer block $262_M$) to achieve a desired average throughput of the first functional block—Block 356.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Figure 4:
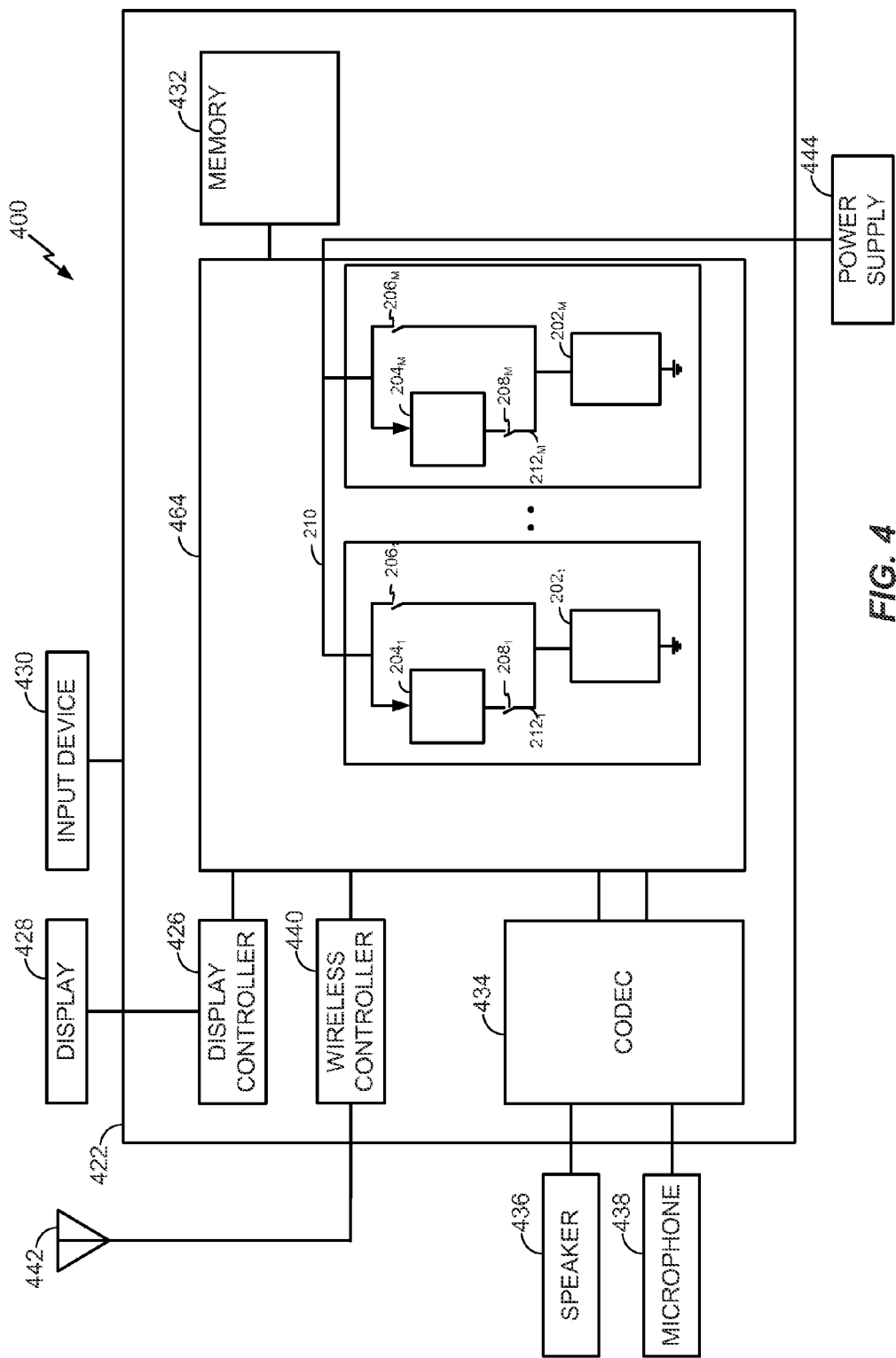
FIG. 4 illustrates an exemplary wireless communication system 400 in which an embodiment of the disclosure may be advantageously employed.

Referring to FIG. 4, a block diagram of a particular illustrative embodiment of a wireless device that includes a multi-core processor configured according to exemplary embodiments is depicted and generally designated 400. The device 400 includes a digital signal processor (DSP) 464, which may include components of processing system 200 illustrated in FIG. 2A. For example, DSP 464 may include functional blocks $202_1 \ldots 202_M$ coupled to shared voltage rail 210, and on-die voltage regulators $204_1 \ldots 204_M$, high power switches $206_1 \ldots 206_M$, and low power switches $208_1 \ldots 208_M$ respectively as shown. In a particular embodiment, power supply 444 is coupled to the system-on-chip device 422, and power supply 444 acts as a high voltage source to supply high voltage to shared high voltage rail 210 coupled to power supply 444. FIG. 4 also shows display controller 426 that is coupled to DSP 464 and to display 428. Coder/decoder (CODEC) 434 (e.g., an audio and/or voice CODEC) can be coupled to DSP 464. DSP 464 is also coupled to memory 432 as shown. Other components, such as wireless controller 440 (which may include a modem) are also illustrated. Speaker 436 and microphone 438 can be coupled to CODEC 434. FIG. 4 also indicates that wireless controller 440 can be coupled to wireless antenna 442. In a particular embodiment. DSP 464, display controller 426, memory 432. CODEC 434, and wireless controller 440 are included in a system-in-package or system-on-chip device 422.

In a particular embodiment, input device 430 is coupled to the system-on-chip device 422. Moreover, in a particular embodiment, as illustrated in FIG. 4, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 depicts a wireless communications device, DSP 464 and memory 432 may also be integrated into a set-top box, a music player, a video player, an entertainment unit, a navigation device, a personal digital assistant (PDA), a fixed location data unit, or a computer. A processor (e.g. DSP 464) may also be integrated into such a device.

Accordingly, an embodiment of the invention can include a computer readable media embodying a bi-modal power delivery method. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of delivering power to an integrated circuit comprising functional blocks, the method comprising:
   providing a first power source to a first functional block of the integrated circuit for supporting a first operating mode of the first functional block;
   deriving a second power source from the first power source; and
   providing the second power source to the first functional block for supporting a second operating mode of the first functional block;
   operating the first functional block in the first operating mode for a first time period; and
   operating the first functional block in the second operating mode for a second time period,
   wherein the first time period and the second time period are determined based on a desired average throughput for the integrated circuit, and
   wherein the first power source is a shared high voltage rail coupled to a high voltage source outside the integrated circuit, and the second power source comprises a first on-die voltage regulator coupled to the first functional block and wherein the first on-die voltage regulator is integrated on a same die as the integrated circuit.

2. The method of claim 1, wherein the first operating mode is a high frequency mode, and the second operating mode is a low frequency mode.

3. The method of claim 1, further comprising providing the shared high voltage rail to a second functional block of the integrated circuit for supporting a first operating mode of the second functional block, and providing the second power source to the second functional block for supporting a second operating mode of the second functional block.

4. The method of claim 3, wherein the second power source further comprises a second on-die voltage regulator coupled to the second functional block.

5. The method of claim 3, wherein the first on-die voltage regulator is shared between the first functional block and the second functional block.

6. The method of claim 2, further comprising:
   coupling the first power source to the first functional block through a first high power switch;
   coupling the second power source to the first functional block through a first low power switch; and
   controlling the first high power switch and the first low power switch to selectively connect the first functional block to the first power source or the second power source based on a desired frequency of operation of the first functional block.

7. The method of claim 6, wherein the desired frequency mode of the first functional block is based on at least one of a desired power target of the first functional block, desired efficiency of the first functional block, or a desired average computational throughput of the integrated circuit.

8. An integrated circuit for bi-modal power delivery comprising:
   a first functional block;
   a first power source coupled to the first functional block and configured to support a first operating mode of the first functional block; and
   a second power source derived from the first power source, the second power source coupled to the first functional block and configured to support a second operating mode of the first functional block;
   logic configured to operate the first functional block in the high frequency mode for a first time period; and
   logic configured to operate the first functional block in the low frequency mode for a second time period,
   wherein the first period and the second period are determined based on a desired average throughput for the integrated circuit, and
   wherein the first power source is a shared high voltage rail coupled to a high voltage source outside the integrated circuit, and the second power source comprises a first on-die voltage regulator integrated on a same die as the integrated circuit.

9. The integrated circuit of claim 8, wherein the first operating mode is a high frequency mode, and the second operating mode is a low frequency mode.

10. The integrated circuit of claim 8, further comprising a second functional block, wherein the shared high voltage rail is further configured to support a first operating mode of the second functional block, and wherein the second power source further comprises a second on-die voltage regulator configured to support a second operating mode of the second functional block.

11. The integrated circuit of claim 8, further comprising:
   a first high power switch configured to couple the first power source to the first functional block;
   a first low power switch configured to couple the second power source to the first functional block; and
   logic configured to control the first high power switch and the first low power switch in order to selectively connect the first functional block to the first power source or the second power source based on a desired frequency of operation of the first functional block.

12. The integrated circuit of claim 11, wherein the desired frequency mode of the first functional block is based on at least one of a desired power target of the first functional block, desired efficiency of the first functional block, or a desired average computational throughput of the integrated circuit.

13. The integrated circuit of claim 8 integrated into a device selected from the group consisting of a set top box, music player, video player, entertainment unit, navigation device, communications device, personal digital assistant (PDA), fixed location data unit, and a computer.

14. A system configured for bi-modal power delivery, the system comprising:
  a first integrated circuit means;
  a first power means coupled to the first integrated circuit means and configured to support a first operating mode of the first integrated circuit means; and
  a second power means derived from the first power means, the second power means coupled to the first integrated circuit means and configured to support a second operating mode of the first integrated circuit means;
  means for operating the first functional block in the first operating mode for a first time period; and
  means for operating the first functional block in the second operating mode for a second time period,
  wherein the first time period and the second time period are determined based on a desired average throughput for the integrated circuit, and
  wherein the first power means is a shared high voltage rail coupled to a high voltage source outside the first integrated circuit means, and the second power means comprises a first on-die voltage regulator integrated on a same die as the first integrated circuit means.

15. A non-transitory computer-readable storage medium comprising code, which, when executed by a processor, causes the processor to perform operations for delivering power to an integrated circuit comprising functional blocks, the non-transitory computer-readable storage medium comprising:
  code for providing a first power source to a first functional block of the integrated circuit for supporting a first operating mode of the first functional block;
  code for deriving a second power source from the first power source; and
  code for providing the second power source to the first functional block for supporting a second operating mode of the first functional block;
  code operating the first functional block in the first operating mode for a first time period; and
  code for operating the first functional block in the second operating mode for a second time period,
  wherein the first time period and the second time period are determined based on a desired average throughput for the integrated circuit, and
  wherein the first power source is a shared high voltage rail coupled to a high voltage source outside the integrated circuit, and the second power source comprises a first on-die voltage regulator integrated on a same die as the integrated circuit.

* * * * *